P. E. WIRT.
TIRE CONSTRUCTION.
APPLICATION FILED AUG. 11, 1909.
1,009,364.
Patented Nov. 21, 1911.
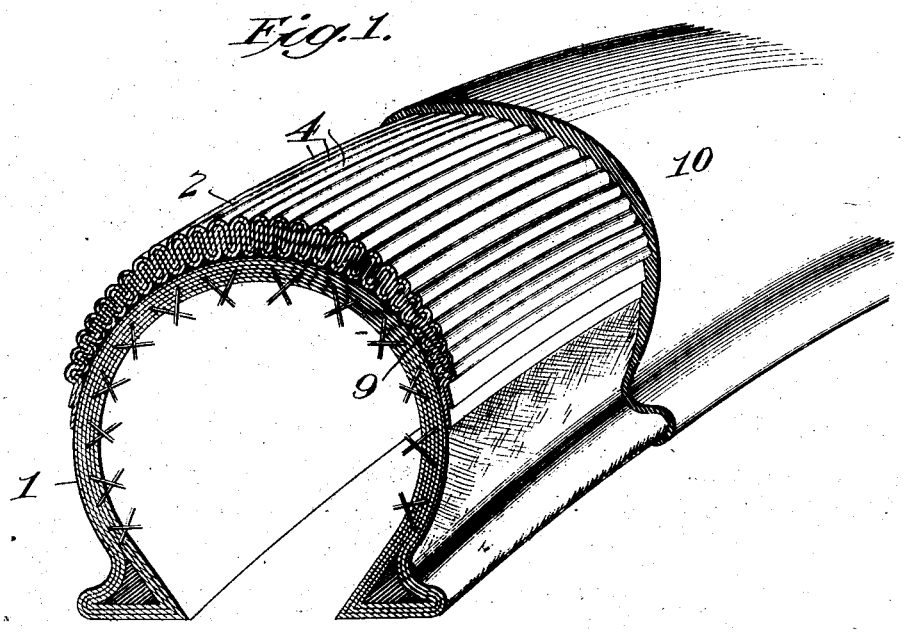
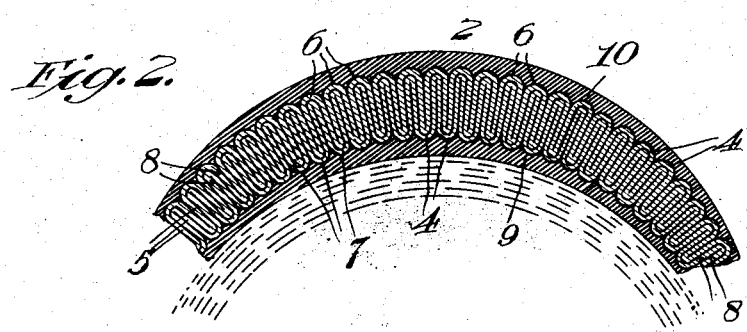
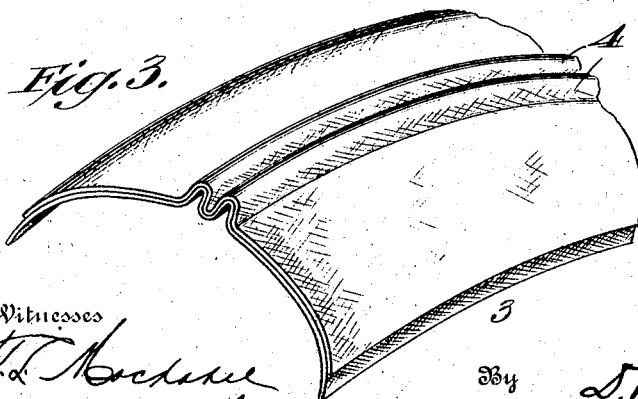
Witnesses
T. L. McLure
R. C. Braddock
Inventor
Paul E. Wirt
By S. V. Holhaupter
Attorney

UNITED STATES PATENT OFFICE.

PAUL E. WIRT, OF BLOOMSBURG, PENNSYLVANIA.

TIRE CONSTRUCTION.

1,009,364.  Specification of Letters Patent.  Patented Nov. 21, 1911.

Application filed August 11, 1909. Serial No. 512,399.

*To all whom it may concern:*

Be it known that I, PAUL E. WIRT, a citizen of the United States, residing at Bloomsburg, in the county of Columbia and State of Pennsylvania, have invented certain new and useful Improvements in Tire Construction, of which the following is a specification.

This invention relates to the subject of pneumatic tires for automobiles and other vehicles, and more particularly to an improved puncture-resisting construction for tires of this character.

To this end the invention has for a general object a puncture-resisting tire construction possessing great strength and wearing capacity, while at the same time having the necessary resiliency and flexibility. In this connection the invention also contemplates a carrying forward of the general principle of construction disclosed in, and covered by, my related Patents Nos. 951,869; 951,870; 951,871 and 951,872, all dated March 15, 1910.

A characterizing feature of the tread formation disclosed in the other applications aforesaid, is that wherein the tire-tread is made up of a plurality of flexible units of rubberized sheet or fabric material adhesively compacted, face to face, and laid on edge so as to present edges and ends of fibers toward the wearing surface of the tire, and also, in some phases of the said construction, the same involves the production of a tread surface made up of soft fabric sheets or strips designed to have the line of surface contact broken or irregular so as to offer greater obstruction to objects or sand entering and wearing through the joints between the units or laminations. This general line of construction, with all of its attendant advantages, is intended to be preserved by the present invention in order to provide a wearing tread for the tire having a maximum strength, integrity, resiliency, endurance, and yielding wearing face, together with a maximum resistance against perforations and other injuries.

While the present invention preserves the general structural features, and the accompanying advantages, of the laminated tire construction wherein the flexible forming units of rubberized fabric are laid on edge so as to present edges toward the wearing surface of the tire, it also has other important practical objects in view. For instance, one of the most important objects of the form of construction claimed herein, is that of providing a laminated tire-tread which is in effect made up of closely and adhesively compacted fabric strips or leaves which are disposed upright on the tire or casing body, while at the same time providing a covering of the same material at the top and bottom of the joints between the leaves or laminations. It is this covering of the laminations, top and bottom, that secures the most advantageous results, particularly in preventing sand or dust being drifted or forced through and under the tread in case there are abrasions or openings produced by constant wear upon its face, thus preventing the tread structure from being prematurely loosened and consequently destroyed.

It has been found in practice that with some forms of laminated tread structures, involving joints between the laminations, slight fissures were caused by the parting of the tread and the adjacent side wall of rubber, with the result that sand is pounded through said fissures, down under the rubber covering of the tire, forming sand blisters or sand boils under the rubber covering of the case at the sides of the tread. At times this damaging action occurs practically around the entire tire, and in some places where sand has been admitted through slight fissures, it has been drifted or pounded by the wearing of the action of the wheel on the road, down under the laminated tread formation itself, with the consequence of forming sand packs, sand blister or boils, which grind up and disintegrate rubber and the contiguous parts of the tire bonded together thereby. It is particularly for the purpose of obviating injuries of this character that the present invention is designed, and the same therefore presents a tire tread formation or structure wherein the respective rubberized fabric layers composing the same are folded over, upon and against each other, in such a manner as to not only preserve the general laminated design herein referred to, but at the same time provide a satisfactory and reliable means for shutting out drifting sand or dust so that it will not find entrance under the tread, or under the external covering of rubber about the tread and the side walls of the casing or body. Also, the construction claimed herein is of such a nature that even though the face of the tread may be worn off, it cannot wear down so as to open up fissures between the layers of the fabric leading to the surface of the tread, unless worn away very materially, such result being safeguarded by the top and bottom coverings for the outstanding leaves or strips of the laminations, and which covering serves to completely cover and close in the line of contact or joints between the leaves or strips. Furthermore, in addition to the provision of means against the entry of sand through the tread, the present invention provides a structure having ample flexibility, and a maximum strength in every direction throughout the whole body of the tread.

With these and many other objects in view, which will more readily appear to those familiar with the art as the nature of the invention is better understood, the same consists in the novel construction, combination, and arrangement of parts hereinafter more fully described, illustrated and claimed.

The essential features of the invention involved in carrying out the objects above indicated, are necessarily susceptible to a wide range of structural modification without departing from the spirit or scope of the invention, but for illustrative purposes, certain forms of construction showing the invention, are given in the accompanying drawings, in which:

Figure 1 is a sectional perspective view of a pneumatic tire provided with a tire-tread constructed in accordance with the present invention, this view illustrating a form wherein the folds or corrugations in the body sheets of the tread run longitudinally about the tire circumference. Fig. 2 is an enlarged cross sectional view of the tread formation shown in Fig. 1. Fig. 3 is a sectional perspective view illustrating a portion of the body material from which the folded or corrugated body is made, and indicating the direction in which the folds or corrugations are made in constructing the form illustrated in Figs. 1 and 2.

Like references designate corresponding parts in the several figures of the drawings.

As herein indicated, the present invention provides a laminated puncture-resisting member for tire construction which may be said to be made up of closely and adhesively compacted outstanding fabric strips or leaves arranged on and about the tire or casing body, the laminated structure also including stout and substantial covering portions or members at the top and bottom of the joint between the leaves or laminations. This construction may obviously be embodied in a variety of forms and also utilized in various ways with any construction of tire body or casing, but in all embodiments of the invention, the same principle of tread formation is preserved, so the invention is exemplified by the two designs illustrated in the drawings.

Referring to the illustration of the invention in Figs. 1 to 3 of the drawings, the tire body or casing body is designated by the numeral 1, and the improved laminated tire tread is designated in its entirety by the numeral 2. The tire body 1 may be of any approved construction without affecting the present invention. It is preferably, however, of the type and construction of tire body disclosed in and covered by my Patent No. 951,873, dated March 15, 1910, though it will be understood that any form of tire body construction may be utilized as a base upon which is bonded into place the separate and improved tire tread 2 constructed in accordance with the present invention. The separate laminated tire tread 2 is composed of one or more layers, preferably four, of rubberized fabric widths laid flat upon each other, to provide a laminated body material. The sheets or layers of fabric constituting the body material are cut from the original sheet of material on the bias so as to present ends of threads toward the outer wearing surface. The body material for the separate tire tread is designated in Fig. 3 of the drawings by the numeral 3, and this material, whether in one or more layers, is subjected, in its sheet form, to the action of suitable forming or crimping mechanism, which forms and gathers a continuous succession of folds or corrugations. These folds or corrugations are designated generally by the reference character 4, and in the operation of forming the same, the said folds or corrugations are closely gathered so that the tread, when removed from its form or support in the forming mechanism, presents a structure wherein the folds may be readily brought into closely and adhesively compacted relation. In this form the individual folds may be said to comprise a plurality of flexible leaves or strips 5 adhesively compacted in flat face to face relation and disposed upright on the tire or casing body 1. That is, the term "upright", as applied to the disposition of the individual leaves or strips 5, is intended to refer to and define the outstanding arrangement of these leaves or strips on the tire body, thus preserving the same general principle of arrangement set forth in my other applications aforesaid. However, in addition to the individual outstanding leaves or strips 5, the individual folds of the tread structure necessarily include top and bottom bights 6 and 7 respectively. These bights in the folded fabric material, usually and preferably including several thicknesses or layers, may be properly termed covering bights or members, inasmuch as the same respectively lie at and cover the top and bottom of the line of contact or joints between the outstanding leaves or strips 5, thereby making a closed-in, so called "vertical fiber", tread presenting all of the functions and advantages of the treads disclosed in my said other application with the additional provision of means for safeguarding the tread against the entry of foreign articles or sand therethrough. By reason of utilizing rubberized fabric material for the body material 3 of the tread, the same may be readily manipulated and worked to the form shown in Fig. 1, in which it is placed on and about the tread carrying portion of the tire body 1. Also, the adhesive faces of this material, when the folds or corrugations are closely compacted, necessarily provide interstitial layers 8 of rubber between the outstanding leaves 5, and these layers or fillings may or may not be amplified with additional rubber if so desired. Moreover, in applying the folded or corrugated tread structure onto the body, a soft rubber bond 9 is filled into and about the entire under side of the tread structure and lies between the same and the outer surface of the body, 1, so that when the whole is vulcanized together, the tread 2 is effectually bonded onto the tire body as a part thereof. Also, in practice, an outer rubber surface covering 10 is placed about the tread 2, and the side portions of the tire body, and is vulcanized thereon at the time the whole built-up structure is vulcanized together.

Fig. 2 of the drawings illustrates more clearly the intimate amalgamation between the folded or corrugated tread and the rubber envelop 9—10 therefor. It will be observed from this figure of the drawings that by reason of the folded or corrugated formation described, the tread body receives and retains about it, at top and bottom, and within the corrugations, a substantial body of soft rubber which materially contributes to the pliability and springiness thereof, without affecting the general toughness of the fabric structure itself. Also, the corrugated form lends itself more rapidly to a secure bonding of the parts, in vulcanizing, than would be otherwise possible.

In the form of the invention shown in Fig. 1, the folds or corrugations are illustrated as extending longitudinally of the circumference of the tire body, but it will of course be understood that variations may be made in the relative angular disposition of the folds or corrugations without affecting the essentials and purposes of the invention. Furthermore, while for illustrative purposes only, the drawings show only two thicknesses of material in the body sheets, and also show an exaggeration of the folds to bring out the individual formation thereof, yet it will be understood that the invention may be carried out with only one thickness of body material and with folds or corrugations of any amplitude without departing from the invention. Also, it is preferable, in making up the folded structure, to have the same tapered at the sides of the tire body to conform more nearly to conventional and practical designs. Also, the feature of diminishing the thickness of the folded structure at the sides serves to provide a gradually yielding tread portion which is necessary from a practical standpoint.

Fig. 3 is simply intended to illustrate the sheet form of the body material in which the folds or corrugations are gathered, and to show generally the usual form of the corrugations as they are crimped up or gathered in the forming mechanism. This has been only generally set forth herein, sufficiently for the purposes of the present application, inasmuch as the exact process carried out in making this tread structure, and the forming mechanism employed therewith, form the subject matter of a separate application filed April 11, 1910, Serial No. 554,840.

From the foregoing description, it will be seen that the laminated folded structure claimed herein is of such a character that ordinary wear or abrasion upon the face of the tire will not provide an opportunity for fissure formation between the respective layers, within and through which sand may enter to produce sand blisters and cause an early break-down of the tire. The respective layers of rubberized fabric being laid one upon the other, and then doubled or folded in corrugations, one against the other, provide a construction in which all of the layers would have to be worn through before a direct fissure between the layers could be formed to the area under the tread. Furthermore, the folded arrangement produces more flexibility and less rigidity than other laminated tire structures hereinbefore referred to, and also there is great strength and binding quality in the wide sheet material forming this tire, and there are no short lengths of thread at any point in the structure. Again, in the construction described, there is the same strength of material at the sides of the tire, although the folds may be diminished in height at those points as compared with the folds in the center of the tire. Consequently the tire may be readily graduated in thickness at or near the edges without diminishing strength. In short the entire folded construction provides a tire of maximum resiliency, integrity, and strength, while at the same time lending itself to variations in the form and shape of the wearing surface, and in the general arrangement of parts without impairing the strength or other desirable qualities of the tire.

Other advantages of the structure described will be readily apparent to those familiar with the art.

I claim:

A tire having a puncture-resisting member formed of sheet material gathered into a succession of closely compacted folds presenting outer bights toward the wearing surface, said folds being graduated in height so as to diminish in height toward the sides of the tire structure, and an outer covering bonded onto said outer bights.

In testimony whereof I hereunto affix my signature in the presence of two witnesses.

PAUL E. WIRT.

Witnesses:
C. W. FUNSTON,
R. L. ORANGE.